United States Patent Office 2,700,666
Patented Jan. 25, 1955

---

2,700,666

METHOD OF PREPARING CORTISONE DERIVATIVES

Seymour Bernstein, Pearl River, N. Y., and Ruddy Littell, Ridgefield Park, N. J., assignors to American Cyanamid Company, New York, N. Y., a corporation of Maine No Drawing. Application April 1, 1953,
Serial No. 346,276

4 Claims.  (Cl. 260—239.55)

This invention relates to the preparation of intermediates useful in preparing hydrocortisone. More particularly, it relates to the preparation of a di-alkylene ketal of cortisone.

It has been estimated that some ten million people in the United States are afflicted with pathological conditions broadly classified as rheumatic diseases. Of this group some two million are affected to such an extent that it seriously interferes with their daily life and ability to earn a living. One of the greatest discoveries for the relief of this condition was that of Kendall when he found that a substance which he called "Compound E" and which was later called cortisone, was effective in relieving these pathological conditions generally. Subsequently Kendall found that a further compound which he called "Compound F" and which is commonly called hydrocortisone was also effective. Recent literature indicates that hydrocortisone is more effective than cortisone and with possibly less side reaction. The full utility of cortisone or hydrocortisone has not been possible because of the numerous steps necessary to synthesize the product from bile acids, diosgenin or other source material, and the resulting high cost of the end products. Recent chemical literature indicates that a number of these steps can be eliminated by a process of fermentation which produces compounds having a hydroxyl radical in the 11-position.

We have now found a new process for converting $\Delta^4$-pregnene-11$\alpha$,17$\alpha$,21-triol-3,20-dione, commonly referred to as 11-epi-compound F, into a di-alkylene cortisone. The process of the present invention calls for reacting the steroid, 11-epi-compound F, with an alkylene glycol to produce di-alkylene ketal groups in the 3- and 20-positions. The alkylene glycols can be compounds such as ethylene glycol, propylene glycol, butylene glycol, and the like. The cheapest and also the most reactive is the ethylene glycol, which is preferred in the process of the present invention. Having obtained the di-alkylene ketal of 11-epi-compound F, this compound is then reacted with chromic anhydride under alkaline conditions. It is necessary that alkaline conditions be used otherwise the alkylene glycol radicals are removed by a process of hydrolysis in the presence of acid. The alkaline conditions can be obtained and maintained by using an organic solvent which is alkaline in reaction such as pyridine, dialkylamines, trialkylamines, quaternary ammonium compounds and the like.

The di-alkylene ketals of cortisone obtained as the products of the present invention are particularly useful in that they can be used in the process described in the application of one of us, Serial Number 259,902, now United States Patent 2,622,081 for the preparation of the di-alkylene ketal of hydrocortisone. This compound obviously can be converted directly to hydrocortisone by hydrolysis. The process as described above gives good yields and involves less steps than those previously described since it is not necessary to prepare cortisone itself.

In the process of the present invention wherein $\Delta^5$-pregnene-11$\alpha$,17$\alpha$,21-triol-3,20-dione di-ethylene ketal is reacted with chromic anhydride under alkaline conditions we prefer to carry out the reaction at a temperature within the range of −10° to 25° C. Following the completion of the reaction which usually takes place within a period of from two to twenty hours, the reaction mixture is treated with a solvent to extract the desired di-alkylene cortisone. The solvent which we have found useful for this purpose is ethyl acetate and other solvents such as benzene, chloroform, carbon tetrachloride, and the like can also be used. After removal of the solvent from the extract, the desired di-alkylene ketal of cortisone can be recrystallized or purified by other methods well known to those skilled in the art.

The following examples illustrate the preparation of a di-alkylene ketal derivative of cortisone and is intended to be by way of illustration and not limitation.

EXAMPLE 1

$\Delta^5$-pregnene-17$\alpha$,21-diol-3,11,20-trione-
3,20-di-ethylene ketal

A mixture of 145 mg. of $\Delta^4$-pregnene-11$\alpha$,17$\alpha$-21-triol-3,20-dione (11-epi-compound F) obtained by fermentation from Reichstein's substance "S," 25 ml. of benzene and 2 ml. of ethylene glycol was slowly distilled for a short time for removal of traces of water. p-Toluenesulfonic acid monohydrate (6 mg.) was added and the mixture was stirred and refluxed for 5 hours (continuous water-removal adapter). Sodium bicarbonate and water were added and the product was extracted with benzene. The extract was washed with water, dried and evaporated under reduced pressure. This afforded a white crystalline residue; melting point about 240°–250° C., cloudy melt, which was slurried with acetone and filtered; 52 mg. (29% yield). Recrystallization of 50 mg. from methanol-acetone yielded 20 mg. of $\Delta^5$-pregnene-11$\alpha$,17$\alpha$,21-triol-3,20-dione di-ethylene ketal; (di-ethylene ketal of 11-epi-compound F); melting point 296°–298° C., $[\alpha]_D^{25}$ −36° (pyridine). Infrared analysis showed identity with authentic sample.

Chromic anhydride (150 mg.) was added to chilled pyridine (15 ml.) and the mixture was allowed to warm to room temperature. A solution of 250 mg. of the di-ethylene ketal of 11-epi-compound F in 20 ml. of pyridine was added and the mixture was allowed to stand at room temperature for 20 hours. It was then poured into 50 ml. of water containing 700 mg. of sodium bicarbonate. This mixture was steam-distilled for about one-half hour, and was extracted with ethyl acetate. The extract was washed with water, dried and evaporated under reduced pressure. This gave 220 mg. (89% yield). The product was slurried with acetone-petroleum ether (boiling point 64°–66°) and gave 80 mg.; melting point 241°–245° C. with previous softening and 116 mg.; melting point 238°–241° C. of $\Delta^5$-pregnene-17$\alpha$,21-diol-3,11,20-trione-3,20-di-ethylene ketal (79% yield). Infrared analysis showed identity with the di-ethylene ketal of cortisone.

EXAMPLE 2

$\Delta^5$-pregnene-11$\alpha$,17$\alpha$,21-triol-3,20-dione di-ethylene ketal

A mixture of 650 mg. of 11-epi-compound F, 30 ml. of benzene and 3.5 ml. of ethylene glycol was slowly distilled for a short time for removal of traces of water. p-Toluenesulfonic acid monohydrate (19 mg.) was added and the mixture was stirred and refluxed for four hours (continuous water-removal adapter). During this time crystals separated. The mixture was cooled, ½ ml. of 2% alcoholic potassium hydroxide was added and evaporated under reduced pressure to about 30 ml. volume. The crystals (11-epi-compound F di-ethylene ketal) were collected; weight, 438 mg.; melting point 295°–297°, with previous softening.

The mother liquor was evaporated to a small volume and was extracted with ethyl acetate. The extract was washed with saturated saline solution, water, dried and evaporated under reduced pressure; weight about 260 mg. The solid was slurried with acetone and the 11-epi-di-ethylene ketal was collected; weight, 74 mg.; melting point, 293°–295°, with previous softening. The two fractions of diketal represented a 63% yield.

We claim:

1. A method of preparing $\Delta^5$-pregnene-17$\alpha$,21-diol-3,11,20-trione-3,20-di-alkylene ketal which comprises oxidizing a $\Delta^5$-pregnene-11$\alpha$,17$\alpha$,21-triol-3,20-dione di-alkylene ketal with chromic anhydride under alkaline conditions and recovering said compound therefrom.

2. A method of preparing $\Delta^5$-pregnene-17$\alpha$,21-diol- 3,11,20-trione-3,20-di-ethylene ketal which comprises oxidizing Δ⁵-pregnene-11α,17α,21-triol-3,20-dione di-ethylene ketal with chromic anhydride under alkaline conditions and recovering said compound therefrom.

3. A method of preparing the di-ethylene ketal of cortisone which comproses oxidizing Δ⁵-pregnene-11α,17α,21-diol-3,20-dione di-ethylene ketal with chromic anhydride in the presence of pyridine and recovering said compound therefrom.

4. A method of preparing the di-ethylene ketal of cortisone which comprises the steps of reacting Δ⁴-pregnene-11α,17α,21-triol-3,20-dione with ethylene glycol and subsequently subjecting the reaction product to oxidation with chromic anhydride in the presence of pyridine and recovering said compound therefrom.

References Cited in the file of this patent

UNITED STATES PATENTS

| | | |
|---|---|---|
| 2,602,769 | Murray | July 8, 1952 |
| 2,622,081 | Bernstein | Dec. 16, 1952 |